Patented Nov. 14, 1922.

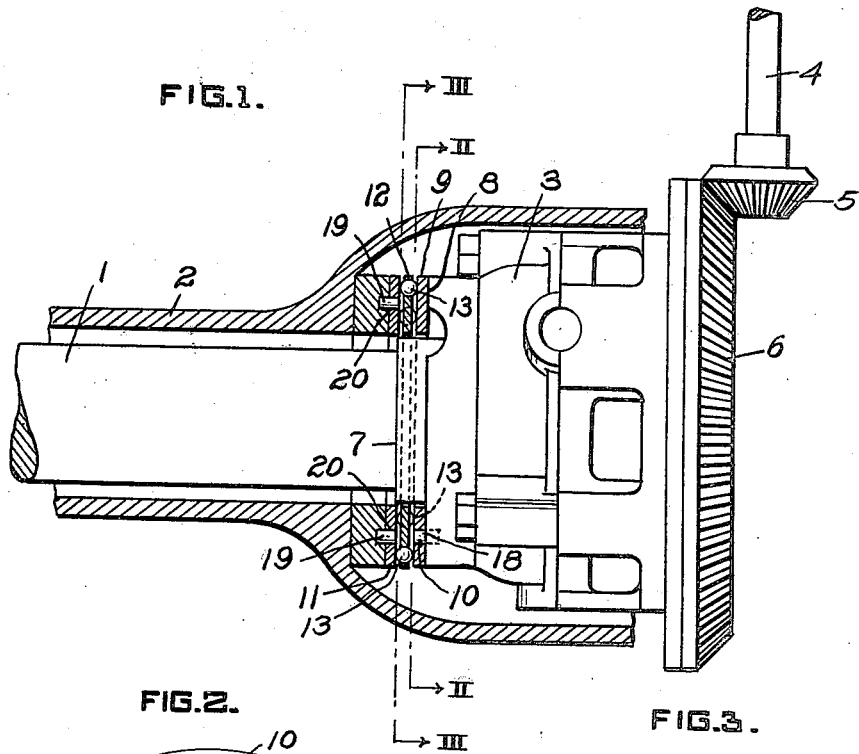
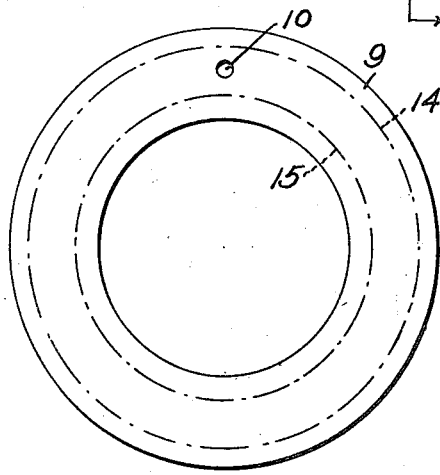
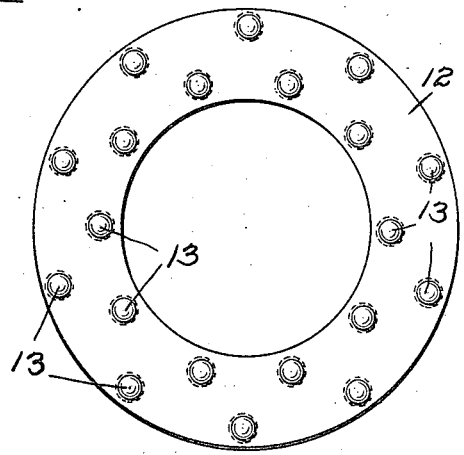

1,435,167

UNITED STATES PATENT OFFICE.

WILLIAM C. LOEFFLER, OF PITTSBURGH, PENNSYLVANIA.

THRUST BEARING.

Application filed July 10, 1920. Serial No. 395,204.

*To all whom it may concern:*

Be it known that I, WILLIAM C. LOEFFLER, a resident of Pittsburgh, in the county of Allegheny and State of Pennsylvania, have invented a new and useful Improvement in Thrust Bearings, of which the following is a specification.

The object of the invention is to provide a thrust bearing which is simple in construction, effective in operation, and which may be manufactured economically.

While the invention is useful in various places where provision for thrust bearings are required, it is particularly applicable to the thrust bearing between a differential gear box or casing in automobile transmission mechanism and the stationary bearings adjacent thereto. In such applicability the invention is illustrated in the accompanying sheets of drawings, of which Fig. 1 is a horizontal central sectional view through a drive-shaft housing and gear-box housing combined with a plan view of a differential gear casing within the housing; and Figs. 2 and 3 sectional views taken on the lines II—II and III—III, respectively.

In the illustrative embodiment of the invention the drive shaft 1 of an automobile is shown within a tubular housing 2 and extending into a differential gear casing 3, the interior construction of which may be of any desired arrangement, it being understood that the shaft 1 rotates substantially in unison with the casing 3. Power may be applied to the casing 3 by a power shaft 4 to which there is attached a bevel pinion 5 meshing with a bevel pinion 6 secured to the end of the casing 3.

In this embodiment of the invention the end of the shaft housing 2 and the end of the gear casing 3 form two members arranged for endwise or thrust bearing upon each other, but it will be understood that such members may be other than those found in automobile transmission mechanism. To form a thrust bearing between the end of the shaft casing 2 and gear casing 3, the gear casing is provided with a laterally projecting flange or ring 7 arranged at the inner edge of a bearing ring seat 8 formed on the end of such casing. A bearing ring 9 of suitably hardened metal rests upon the seat 8, and, for affecting a supporting connection of the ring to the casing 3 the ring 9 is provided with an opening 10 arranged substantially midway between the inner and outer edge thereof as seen particularly in Fig. 2. A pin 18 formed on the casing 3, and projecting outwardly from the seat 8 thereof, extends into the opening 10. To the shaft housing 2 there is also similarly attached a bearing ring 11, such ring being provided with two openings 20 to receive two pins 19. Both the pins 18 and 19 are arranged substantially midway between the inner and outer edges of the surfaces upon which the rings 9 and 11 bear.

Between the bearings rings 9 and 11 there is arranged a ball thrust bearing of the form illustrated in Fig. 3, the same comprising an annular ring or plate 12 provided with ball bearings 13 which project from each face of the plate and are arranged in two concentric circles, one on each side of the openings 10 and 20 in the bearing rings 9 and 11. The arrangement is such that the ball bearings will not encounter the openings 10 and 20, the general line or path of bearing of the outer ring of balls being indicated by the dotted line 14 in Fig. 2, and the corresponding line of bearing of the inner ring of balls by the dotted line 15.

The thrust bearing which is thus provided may be easily and economically manufactured and may be used in place of some present types of thrust bearings in which the annular plates 9 and 11 bear directly upon each other, and in consequence thereof become subject to considerable friction and rapidly wear out. By using the thrust bearing disclosed herein, not only the life of the bearing is much prolonged, but the friction is very substantially reduced so that more of the available power becomes affective for its intended driving purpose.

According to the provisions of the patent statute, I have described the principle and operation of my invention together with the construction which I now consider to represent the best embodiment thereof. However, I desire to have it understood that, within the scope of the appended claims my invention may be practiced by other forms of construction than that specifically shown and described herein.

I claim:

1. The combination with two members arranged for endwise bearing upon each other, thrust bearing rings supported one by each of said members, one of said rings being provided with an opening substantially midway between its inner and outer edge for attachment to its supporting member, said opening interrupting the bearing face of the ring, and a ball thrust bearing arranged between said rings and comprising a plate provided with ball bearings projecting from each face thereof and arranged in two concentric circles one on each side of said bearing-ring opening, whereby the ball bearings continuously rest upon the uninterrupted portions of said rings.

2. The combination with two members arranged for endwise bearing upon each other, thrust bearing rings supported one by each of said members, one of said rings being provided with an opening substantially midway between its inner and outer edges and interrupting the bearing face of the ring, a supporting member for said ring being provided with a pin projecting into said opening for attaching the ring to said member, and a ball thrust bearing arranged between said rings and comprising a plate provided with ball bearings extending through the plate and projecting from each side thereof, said ball bearings being arranged in two concentric circles, one on each side of said bearing ring openings, whereby the ball bearings continuously rest upon the uninterrupted portions of said rings.

3. In an automobile transmission gear, the combination of a rotatable differential gear casing provided at its end with a bearing-ring seat, a pin projecting from the face of said seat, an annular bearing ring provided with a hole substantially midway between its inner and outer edges, said hole receiving said pin, a stationary bearing adjacent to said ring, and an annular thrust bearing arranged between said ring and stationary bearing, said bearing comprising a plate provided with ball bearings projecting from each face thereof and arranged in two concentric circles one on each side of said pin-receiving hole, whereby the ball bearings continuously rest upon the uninterrupted portions of said rings.

In testimony whereof, I have hereunto set my hand.

WILLIAM C. LOEFFLER.

Witnesses:
PAUL N. CRITCHLOW,
HOWARD L. SNIVELY.